United States Patent [19]

Winters et al.

[11] 3,882,079

[45] May 6, 1975

[54] METHOD FOR PREPARING PIGMENTED POLYETHYLENE TEREPHTHALATE

[75] Inventors: Terence E. Winters, Mogadore; Andrew P. Venditto, Akron, both of Ohio

[73] Assignee: The Goodyear Tire & Rubber Company, Akron, Ohio

[22] Filed: Jan. 14, 1974

[21] Appl. No.: 432,914

Related U.S. Application Data

[63] Continuation of Ser. No. 327,373, Jan. 29, 1973, abandoned.

[52] U.S. Cl. ............................................. 260/40 P
[51] Int. Cl. ............................................. C08g 51/04
[58] Field of Search............ 260/40 P, 37 NP, 37 P

[56] References Cited
UNITED STATES PATENTS

| | | | |
|---|---|---|---|
| 3,002,942 | 10/1961 | Zoetbroad | 260/40 P |
| 3,007,892 | 11/1961 | Gruschke et al. | 260/40 P |
| 3,489,713 | 1/1970 | Bowman et al. | 260/40 P |

OTHER PUBLICATIONS

J. Bjorksten, Polyesters and their Applications, 1956, p. 212, (TP 986.P6 B5)

*Primary Examiner*—M. J. Welsh
*Assistant Examiner*—S. M. Person
*Attorney, Agent, or Firm*—F. W. Brunner; J. P. Ward

[57] ABSTRACT

There is disclosed a method for pigmenting polyethylene terephthalate prepared by the process of esterifying a mixture of terephthalic acid and ethylene glycol to give a low molecular weight esterification product and then polymerizing said esterification product which comprises adding a dimethyl terephthalate-ethylene glycol based polyethylene terephthalate masterbatch containing a pigmenting agent to the polymerizing esterification product of terephthalic acid and ethylene glycol at a point in the polymerization step wherein the pressure is being reduced and is in the range of from 100 to 0.1 millimeters of mercury pressure and the temperature of the polymerizing esterification product is in the range of from 245° to 280°C. and continuing said polymerization step until the desired intrinsic viscosity is attained.

2 Claims, No Drawings

METHOD FOR PREPARING PIGMENTED POLYETHYLENE TEREPHTHALATE

This is a Continuation of application Ser. No. 327,373 filed Jan. 29, 1973 now abandoned.

This invention relates to a method for pigmenting polyethylene terephthalate homopolymer. More particularly this invention relates to a method for pigmenting polyethylene terephthalate homopolymer prepared by esterifying a mixture of terephthalic acid and ethylene glycol and polymerizing the esterification reaction product thereof.

Polyethylene terephthalate is made commercially at the present time by two methods. In the first method dimethyl terephthalate is reacted with ethylene glycol under ester interchange conditions and the ester interchange product is condensed with elimination of glycol to form highly polymeric polyester. Generally this process is referred to as the "dimethyl terephthalate" or "DMT" process and for convenience in this specification the product produced according to this method is called DMT-based polyethylene terephthalate. In the second method terephthalic acid is reacted with ethylene glycol under esterification conditions and the product of esterification condensed with elimination of glycol to form highly polymeric polyester. Generally this process is referred to as the "terephthalic acid" or "TPA" process and for convenience in this specification polyester made by this latter method is called TPA-based polyethylene terephthalate.

It is customary to add a pigmenting agent to polyester used for the production of fibers. The pigmenting agent is a material such as titanium dioxide or other finely divided pigment that makes the polyester white or some other desired color and generally aids in the drawing of fibers made from polyester.

In pigmenting DMT-based polyethlene terephthalate it has been the practice to disperse the desired pigment in an organic liquid such as ethylene glycol to form a slurry and then adding this slurry to the polyester forming reactants or to the transesterification product produced therefrom. The transesterification product is then polymerized to give high molecular weight polyethylene terephthalate containing an essentially homogeneous dispersion of pigment. Another method for obtaining homogeneous dispersions of pigment in DMT-based polyethlene terephthalate is described in French Pat. No. 1,399,386. The method of this French patent comprises first grinding together, in a paint mill or other suitable grinding device, the desired pigment and a noncrystallizable copolyester having an intrinsic viscosity of 0.45 to 0.55 or higher to form a pigmented polyester masterbatch. Then this masterbatch is added to a polymerizing melt of the polyester it is desired to pigment at a point in the polymerization process when the polymerizing polyester and the pigment-polyester masterbatch posses similar molecular weights, that is, when the polymerizing polyester has an intrinsic viscosity of 0.45 to 0.55 or higher. After addition of the masterbatch the polymerization is quickly completed.

While the above described pigmenting processes have proven satisfactory for producing pigmented DMT-based polyesters they have not proven satisfactory for pigmenting TPA-based polyethylene terephthalate. For example, when a slurry of titanium dioxide and ethylene glycol is added to the TPA-based polyethylene terephthalate process, significant agglomeration of titanium dioxide particles is observed. The later processing of the pigmented TPA-based polyethylene terephthalate is made difficult by the presence of these agglomerated particles. The process of the French patent is also unsuitable for the reason that the high melting point (265° C. or higher) of pure high molecular weight polethylene terephthalate (i.e., intrinsic viscosities of 0.45 or higher) makes it most difficult to prepare a pigmented masterbatch of this polyester through a mechanical grinding step. Due to the high temperatures required to melt this polyester and the high shear forces generated by the high melt viscosities involved a substantial degree of degradation can occur, making the polyester unsuitable for subsequent fiber formation and use. Finally, the process of the French patent is unsuitable in that while it might be possible to pigment TPA-based polyethylene terephthalate employing a pigmented copolyester masterbatch such as a 60/40 or 40/60 ethylene terephthalate/ethylene isophthalate copolyester, the use of such a copolyester masterbatch would not only introduce alien groups (i.e., isophthalate groups) but also lower the melting point of the desired pure polyethylene terephthalate homopolyester.

A method has now been found for pigmenting polyethylene terephthalate homopolymer prepared by esterifying a mixture of terephthalic acid and ethylene glycol to give a low molecular weight esterification product and then polycondensing said low molecular weight esterification product to high molecular weight polyethylene terephthalate which comprises adding to said polycondensing esterification product a pigmented polyethylene terephthalate masterbatch. The pigmented polyethylene terephthalate masterbatch is prepared by first forming a slurry consisting of a pigmenting agent and ethylene glycol and then adding this slurry to a transesterification reaction mixture of dimethyl terephthalate and ethylene glycol or the transesterification reaction products thereof and polycondensing said pigment containing reaction products to form the pigmented polyethylene terephthalate masterbatch. By this process, pigmented TPA-based polyethylene terephthalate essentially free of agglomerated pigment and fibers produced therefrom have been successfully prepared.

As set forth hereinabove, the DMT and TPA processes for preparing polyethylene terephthalate are well known. In the DMT process the transesterification reaction is generally carried out with a molar ratio of ethylene glycol to dimethyl terephthalate of from about 1.5/1 to about 3.0/1 and preferably from about 1.8/1 to about 2.4/1. Further, the transesterification reaction is generally carried out at temperatures ranging from about 140° C. to about 240° C. and preferably from 170° C. to about 220° C. at pressures ranging from atmospheric to superatmospheric. The reaction is run in the absence of oxygen and generally is carried out in an atmosphere of nitrogen.

In the TPA process the esterification reaction may be carried out with a molar ratio of ethylene glycol to terephthalic acid ranging from 1.0/1 to 2.0/1 and preferably from 1.05/1 to 1.3/1 at temperatures ranging from 240° to 320° C. in the absence of oxygen and at pressures ranging from atmospheric to superatmospheric pressures to form a low molecular weight polyethlene terephthalate prepolymer having a degree of polymerization (D.P.) of from 2 to 20. The esterification reaction can also be carried out in the presence of a solvent, said solvent consisting of low molecular weight polyethylene terephthalate prepolymer such as described immediately above. When low molecular weight polyethylene terephthalate is employed as a solvent in the process the weight ratio of this solvent to the esterification reactants ranges from about 0.5/1 to 5.0/1 and preferably from 1.0/1 to 1.4/1.

The transesterification reaction products of the DMT process and the low molecular weight prepolymer resulting from the esterification reaction step of the TPA process are then polycondensed according to the usual techniques. Generally these techniques involve subjecting the intermediate products to elevated temperatures ranging from 210° to 300°C. and a reduction in reaction pressure to one millimeter of mercury pressure or less. Polycondensation catalysts such as antimony trioxide are employed to initiate the polycondensation reaction. In addition, various other materials may be added to polyethlyene terephthalate producing processes, such as thermal, hydrolytic and ultraviolet light stabilizers.

The point in time at which the pigmented DMT-based polyethylene terephthalate masterbatch is added to the polycondensation step of the TPA process is of singular importance. It has been found that if pigmented, high molecular weight polyethylene terephthalate homopolyester of good homogeneity is to be achieved through the process of this invention it is essential that the appropriate amount of pigmented masterbatch be added to the polycondensation or polymerization step of the TPA process at a time when the pressure in the reaction vessel ranges from 100 to 0.1 millimeters of mercury pressure and the temperature of the polymerizing mass is between 245° and 285° C. inclusive. The number of pigment particles in a one-eighth inch cube of polyester greater than 10 microns was determined to be minimal when the masterbatch was added under the above noted conditions. In contrast, when the pigmented masterbatch was added to the TPA process at the beginning of the polycondensation step or just prior to carrying out the polycondensation step (i.e., when the pressure in the reaction vessel is one atmosphere or more and the temperature of the reaction mixture is between 245° and 260° C.) it was found that a substantial number of the pigment particles were greater than 10 microns. A particle of 10 microns is used herein as a reference point. The greater the number of particles under 10 microns in size the better the dispersion and the more suitable the pigmented polyethylene terephthalate resin is for fiber production.

In general the pigment/ethylene glycol slurry employed in the production of the pigmented DMT-based polyethylene terephthalate masterbatch will contain from 15 to 25 percent by weight of the pigment. This slurry is then added to the DMT process to give a masterbatch containing from 10 to 50 percent by weight of pigment based on the total weight of masterbatch. A sufficient quantity of the pigmented masterbatch is then added to the TPA process so that the final TPA-based polyethylene terephthalate homopolyester resin contains from about 0.01 to about 3.0 weight percent of pigment and preferably between 0.2 to 0.5 weight percent.

The following examples illustrate the invention. The number of pigment particles in a one-eighth inch cube sample of pigmented TPA-based polyethylene terephthalate homopolyester greater than 10 microns was determined by a microscopic examination of the melted cube employing a stereoscopic microscope with 40X magnification.

EXAMPLE 1

Three hundred pounds of pigment grade titanium dioxide and 720 pounds of ethylene glycol were placed in a mixing tank and stirred for 2 hours with a dispersator, high shear type agitator. The slurry thus prepared was passed through a Sharples super centrifuge three times to remove any oversize particles or agglomerates. After centrifuging the slurry contained approximately 20 to 25 percent by weight of titanium dioxide.

EXAMPLE 2

A pigmented, dimethyl terephthalate based polyethylene terephthalate masterbatch was prepared as follows: To a 12 pound stainless steel reactor equipped with a stirrer, condenser and charge port were added 7.27 pounds of dimethyl terephthalate, 4.88 pounds of ethylene glycol, 4.61 milliliters of manganese octoate solution and 0.408 gram of ammonium polyphosphate. This reaction mixture was then heated at 245° C. under atmospheric pressure. During the course of the transesterification reaction methyl alcohol was continually removed. After 2.5 hours the reaction was essentially complete. The reaction product was then transferred to a second 12 pound stainless steel reactor equipped with stirrer, condenser and vacuum pump. To the reaction product were then added 0.818 gram of antimony trioxide and 4.96 pounds of the titanium dioxide-ethylene glycol slurry prepared in Example 1 above. The temperature of the reaction mixture was raised to 285° C. and the pressure reduced to 1.0 millimeter of mercury pressure or less. Polycondensation was continued under these conditions until the pigmented polyethylene terephthalate masterbatch had reached the desired intrinsic viscosity. The masterbatch had an intrinsic viscosity of about 0.5.

EXAMPLE 3

To a stainless steel reactor equipped with agitator, condenser and nitrogen inlet and containing approximately 120 pounds of polyethylene terephthalate having a degree of polymerization of about 5 were added 86.5 pounds of terephthalic acid, 38.8 pounds of ethylene glycol, 2.43 grams of sodium acetate and 2.84 grams of ammonium polyphosphate. The esterification reaction was carried out for about 2.5 hours at a pressure of 35 pounds per square inch gauge pressure and a temperature ranging from 240° to 260° C. The esterification reaction product was transferred to a second reactor equipped with agitator, condenser and vacuum line. Then 665 milliliters of antimony trioxide glycolate containing 14.0 grams of antimony per liter were added to the reactor. The reaction temperature was then raised to about 260° C. and the pressure reduced, over a period of approximately 1 hour, to 1.0 millimeter of mercury pressure and less. When the pressure in the reactor was between 10 and 50 millimeters of mercury pressure 926.1 grams of the pigmented masterbatch from Example 2 were added to the reactor and vacuum pulldown was continued. Once the pressure reached 1.0 millimeter of mercury pressure the reaction temperature was raised to between 270° and 290° C. The polycondensation was continued under these conditions until the polymerizing mixture had attained the desired intrinsic viscosity.

A one-eighth inch cube sample of the polyethylene terephthalate prepared in Example 3 above was found to contain only 25 particles larger than 10 microns in size. By comparison, a one-eighth inch cube of polyethylene terephthalate prepared in the same manner as that prepared in Example 3, with the exception that a titanium dioxide-ethylene glycol slurry was employed in place of the pigmented masterbatch, contained 1,200 particles larger than 10 microns in size.

While certain representative embodiments and details have been shown for the purpose of illustrating the invention it will be apparent to those skilled in this arts that various changes and modifications may be made therein without departing from the spirit or scope of the invention.

We claim:

1. In a process for incorporating from 0.01 to 3.0 weight percent of a pigment into polymerizing polyethylene terephthalate prepared by reacting terephthalic acid with ethylene glycol under esterification conditions to give an esterification product and then polymerizing the esterification product under conditions of reduced pressure and elevated temperature with the elimination of glycol the improvement which comprises adding said pigment, to said polymerizing esterification product at a point in the polymerization of said esterification product when the reduced pressure ranges from 100 to 0.1 millimeters of mercury pressure and the elevated temperature ranges from 245° to 285° C. and wherein said pigment is added to said polymerizing esterification product in the form of a pigmented polyethylene terephthalate masterbatch said masterbatch being prepared by adding a pigment/ethylene glycol slurry to a transesterification reaction mixture of dimethyl terephthalate and ethylene glycol or the transesterification product thereof and then polymerizing said transesterification reaction product.

2. The improvement of claim 1 wherein the pigment is titanium dioxide.

* * * * *